(12) United States Patent  
van Rotterdam et al.

(10) Patent No.: US 8,667,140 B1
(45) Date of Patent: Mar. 4, 2014

(54) DISTINGUISHING TENANTS IN A MULTI-TENANT CLOUD ENVIRONMENT

(75) Inventors: Jeroen van Rotterdam, Berkeley, CA (US); Mark Polman, Rotterdam (NL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/077,965

(22) Filed: Mar. 31, 2011

(51) Int. Cl.
*G06F 15/173* (2006.01)

(52) U.S. Cl.
USPC ........... 709/226; 709/217; 709/218; 709/219; 709/223; 709/225; 709/229

(58) Field of Classification Search
CPC ....... H04L 43/04; H04L 9/3236; H04L 47/78; H04L 63/20
USPC .......... 709/217, 218, 219, 223, 225, 226, 229
See application file for complete search history.

(56) References Cited

U.S. PATENT DOCUMENTS

| | | | |
|---|---|---|---|
| 7,475,419 | B1 | 1/2009 | Basu et al. |
| 7,996,636 | B1 | 8/2011 | Prakash et al. |
| 8,020,037 | B1 | 9/2011 | Schwartz et al. |
| 2005/0246397 | A1 | 11/2005 | Edwards et al. |
| 2005/0246503 | A1 | 11/2005 | Fair |
| 2006/0031918 | A1 | 2/2006 | Sarachik et al. |
| 2008/0238919 | A1 | 10/2008 | Pack |
| 2009/0083738 | A1 | 3/2009 | Kruglick et al. |
| 2009/0138792 | A1 | 5/2009 | Cudich et al. |
| 2011/0265157 | A1* | 10/2011 | Ryder ............................. 726/6 |
| 2012/0030318 | A1* | 2/2012 | Ryder ........................ 709/220 |
| 2012/0030343 | A1* | 2/2012 | Ryder ........................ 709/224 |
| 2012/0047313 | A1 | 2/2012 | Sinha et al. |

* cited by examiner

*Primary Examiner* — Liangche A Wang
(74) *Attorney, Agent, or Firm* — Theodore A. Chen; Krishnendu Gupta

(57) ABSTRACT

A method, article of manufacture, and apparatus for managing a cloud computing environment. In some embodiments, this includes designating a tenant space for a tenant, allocating resources to the tenant in the tenant space based on the tenant, associating the tenant with a tenant authentication, and storing the association in a storage device. The tenant is allowed access to the allocated resources upon successful authentication of the tenant.

4 Claims, 5 Drawing Sheets

DISTINGUISHING TENANTS IN A MULTI-TENANT CLOUD ENVIRONMENT

CROSS REFERENCE TO RELATED APPLICATIONS

This application is related to co-pending U.S. patent application Ser. No. 13/077,961 for SPACE INHERITANCE and filed concurrently herewith, which is incorporated herein by reference for all purposes.

FIELD OF THE INVENTION

This invention relates generally to cloud computing systems, and more particularly to systems and methods for partitioning cloud computing systems.

BACKGROUND OF THE INVENTION

Increasingly, consumers of computer resources are utilizing the cloud. Cloud computing generally refers to the provisioning of computer resources through a network at the time a user requests those resources.

Cloud computing provides several benefits. One such benefit is costs savings. Before the cloud, users had to invest in their own hardware and software. This led to a high amount of initial investment in information technology. Further, when a user needed only a small increase in computer resources (e.g. slightly more storage capacity), the user typically could only buy new equipment that provided more resources than required.

Cloud service providers generally have many clients, or users. These clients typically store their data on the cloud service provider. For a variety of reasons, such as privacy, the cloud service provider typically partitions user data and other objects. However, if several users have data in common, some efficiencies of cloud computing are lost when the cloud service provider maintains several copies of the common data. Further, there are overhead costs associated partitioning data. There is a need, therefore, for an improved method, article of manufacture, and apparatus for partitioning cloud computing systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
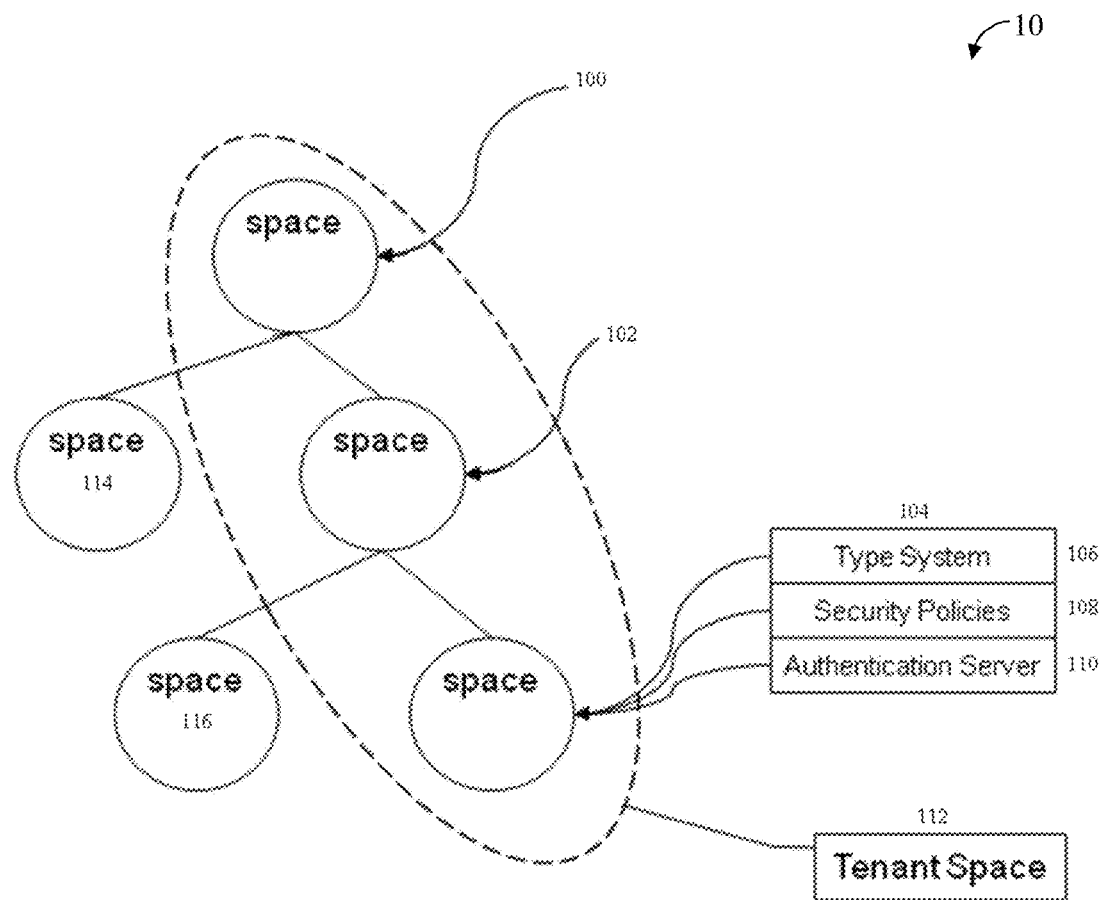
FIG. 1 is a diagram of a space tree in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The enhanced techniques described herein allow for a multi-tenant cloud computing environment to share resources, such as content objects, applications, authorization entities, etc. Sharing of the resources, while offering partitioning, is done in a controlled way with little overhead costs per user.

This is accomplished by using "spaces." A space is a logical partitioning of resources. A resource may be a hardware resource or a software resource. For example, a resource may be CPU allocation, hard disk storage space, an application, code, or authentication servers, among others.

A space may have child spaces and parent spaces. In addition to partitioning resources, spaces may also organize precedence of resources in some embodiments. For example, in some embodiments, a space lower in a space tree may override or take precedence over a space higher in the space tree.

FIG. 1 illustrates a space tree in accordance with some embodiments. Space Tree 10 includes Spaces 100, 102, 104, 114 and 116. Space 104 is illustrated to include Type System 106, Security Policies 108, and Authentication Server 110, which are applied to Space 104. Various other policies may be applied to other spaces, but are not shown in FIG. 1. In Space Tree 10, Space 104 is a child space of Space 102, and Space 102 is a parent space of 104. Space 102 is also a child space of Space 100. Tenant Space 112 represents the space(s) that are available to a specific user, or tenant.

Depending on the user (e.g. tenant), the number of spaces available may vary greatly. For example, in some embodiments, Space Tree 10 may represent all the spaces available to a corporation. Space 100 may represent the company's general space (may have company wide documents and procedures, biographies of senior management, etc.), Space 102 may represent the legal department's space (may have the legal department's policies and procedures, etc.), and Space 104 may represent a specific attorney's space (may include the personal documents and contact list of the specific attorney). If the specific attorney logged into Space 104 using Space 104's authentication policies, in some embodiments, the specific attorney would be granted access to Space 104 and its parent spaces (e.g. Spaces 102 and 100). The specific attorney would be granted access to Spaces 102 and 100 even if their respective authentication servers were not the same as Space 104's. In this case, the specific attorney's tenant space would be Spaces 104, 102, and 100, which is the same as illustrated by FIG. 1 Tenant Space 114. However, if the specific attorney logged into Space 102 using Space 102's authentication server (not shown in FIG. 1), the specific attorney would be granted access to only Space 102 and its parent space (e.g. Space 100). In this case, the specific attorney's tenant space would be Spaces 102 and 100. It should be noted that if the attorney logged into Space 102, the attorney would not be granted access to any sister spaces (Space 114 as illustrated in FIG. 1). Similarly, if someone logged into Space 114, he or she would not be granted access to Space 104. Rather, his or her tenant space would include only Spaces 114 and 100.

Further, in some embodiments, policies may dictate that different tenants see different resources in a space. For example, Space 102's policy may dictate that a tenant logged on through Space 104 may view all of Space 102's resources, but a tenant logged on through Space 116 may view only a subset of Space 102's resources.

Using the enhanced techniques described herein, a cloud service provider may similarly share resources among a large number of users (or tenants) while still partitioning resources among the tenants. For example, a "top" space may include an application accessible to all tenants, and a "low" space may include specific documents created by a specific tenant using the "top" space application. In this way, the cloud service provider does not need a separate copy of the application for each tenant. Overhead is similarly reduced while adding tenants.

In some embodiments, policies may also be used to map spaces to physical partitions. These may be referred to as physical mapping policies. For example, a physical mapping policy may be:

Resources starting with "A" are stored in Server X, Directory Y
Resources of .doc type are stored in Database Z.
Resources by author B are stored in Database C.

As illustrated by the above examples, physical mapping policies identify a set of resources based on some criteria, and at least one physical partition.

Figure 2:
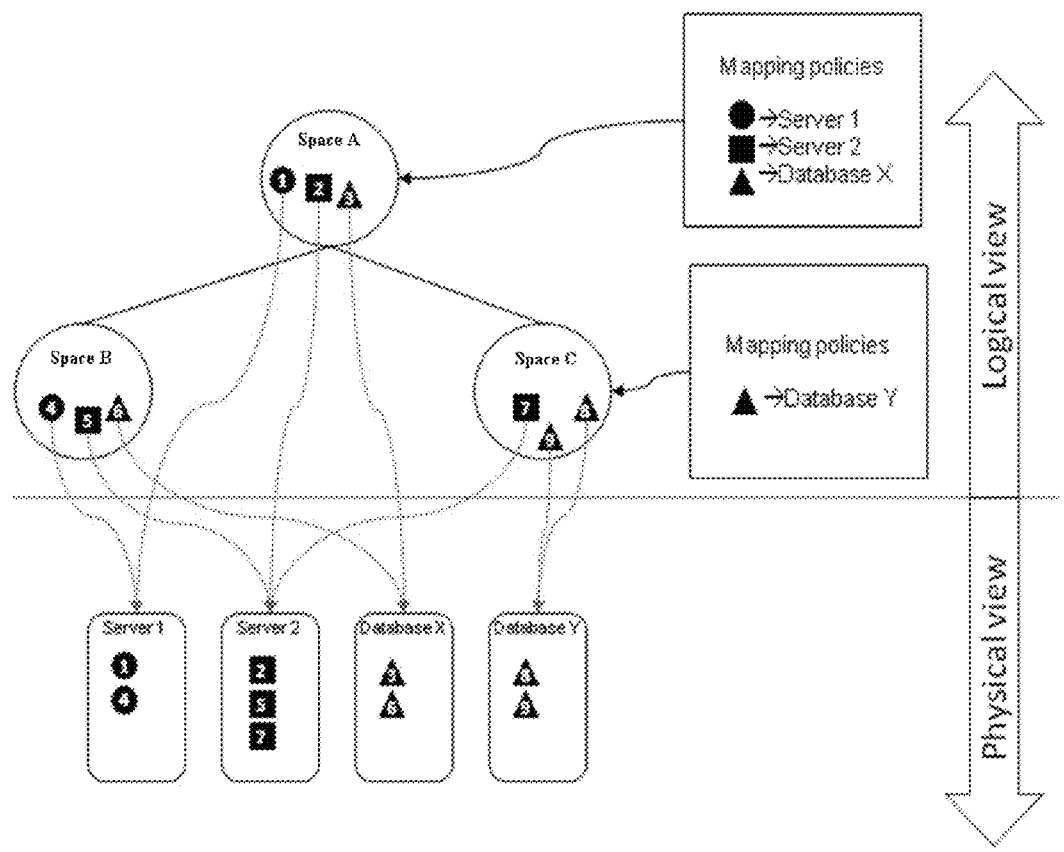
FIG. 2 is a diagram of a space tree in accordance with some embodiments.

In some embodiments, spaces may inherit spaces from their parent spaces. FIG. 2 illustrates how a space may inherit a physical mapping policy from its parent space, and how a space may override its parent's physical mapping policy. As shown in FIG. 2, Space A has the following mapping policies applied:

Circle Resources are stored in Server 1
Square Resources are stored in Server 2
Triangle Resources are stored in Database X Resource 1 is stored in Server 1 since Resource 1 is of a circle type. Similarly, Resource 2 is stored in Server 2 since it is of a square type. Space A is the parent space of Space B and of Space C. Space B inherits its mapping policy from Space A. Accordingly, Resource 4 is stored in Server 1 since Resource 4 is of a circle type, and Resource 6 is stored in Database X since Resource 6 is of a triangle type.

Space C, like Space B, is a child space of Space A, and inherits Space A's mapping policy. However, Space C also has its own policy on how to handle Triangle Resources, and will overrides Space A's policy to the extent the two policies conflict. As illustrated in FIG. 2, Resource 7 is stored in Server 2 since it is a square type resource (as dictated by Space A's policies and inherited by Space C). However, the two policies conflict with regard to how to manage resources of the triangle type. Space A's policy stores triangle resources in Database X, whereas Space C's policy stores triangle resources in Database Y. Since Space C's policy will override Space A's policy, Resources 8 and 9 will be stored in Database Y.

Figure 4:
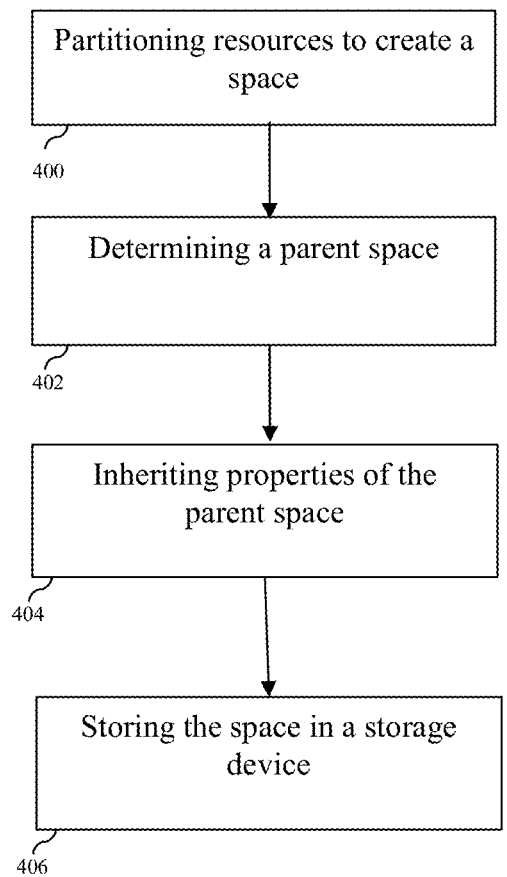
FIG. 4 is a flowchart of a method to manage a cloud computing environment in accordance with some embodiments.

FIG. 4 illustrates a method to manage a cloud computing environment in accordance with some embodiments. In step 400, resources are partitioned to create a space. In step 402, a parent space is determined. In step 404, properties of the parent space are inherited. In step 406, the space is stored in a storage device. In some embodiments, the resources of the created space may be designed a precedence which allows the created space to override the inherited properties of the parent.

Figure 3:
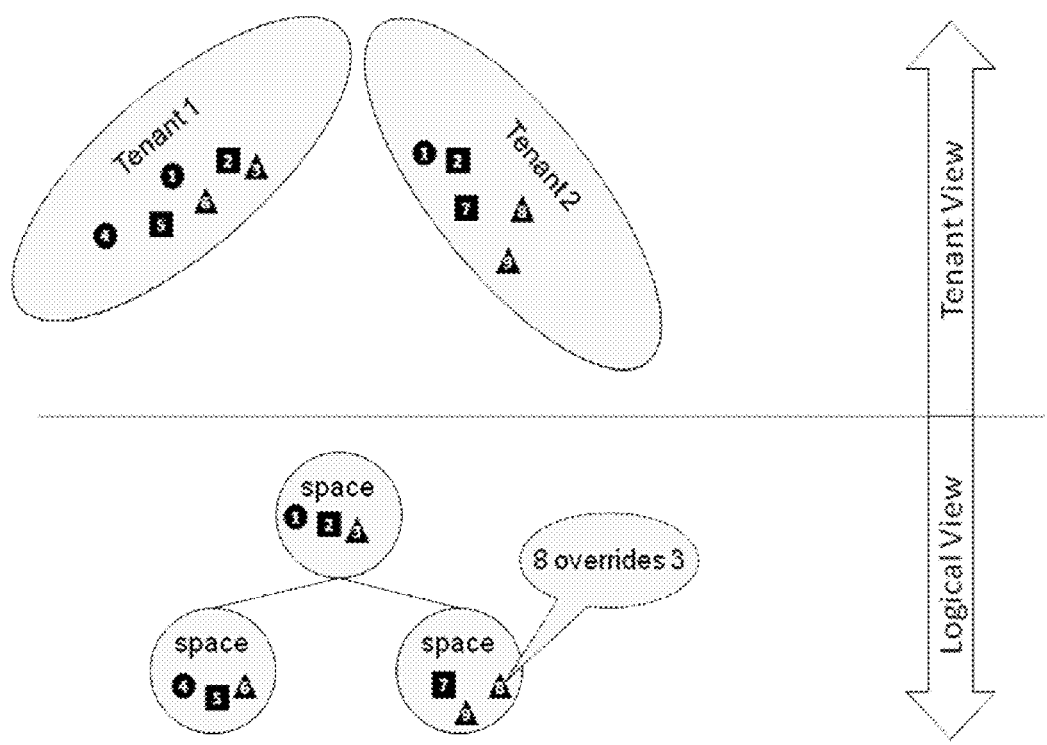
FIG. 3 is a diagram of a tenant space in accordance with some embodiments.

FIG. 3 illustrates the above example through a tenant's view. Suppose Tenant 1 logs onto Space B. Tenant 1's tenant space will consist of Space A and Space B. Thus, Tenant 1 will see Resources 1, 2 and 3 from Space A, and 4, 5 and 6 from Space B. Further, Tenant 1 will see Resources 1 and 4 are stored in Server 1, Resources 2 and 5 are stored in Server 2, and Resource 6 stored in Database X.

Suppose a Tenant 2 logs onto Space C. Tenant 2's tenant space will consist of Space A and Space C. Thus, Tenant 2 will see Resources 1, 2 and 3 from Space a, and 7, 8 and 9 from Space C. Further, Tenant 2 will see Resources 1 is stored in Server 1, Resources 2 and 7 are stored in Server 2, and Resources 8 and 9 are stored in Database Y.

Figure 5:
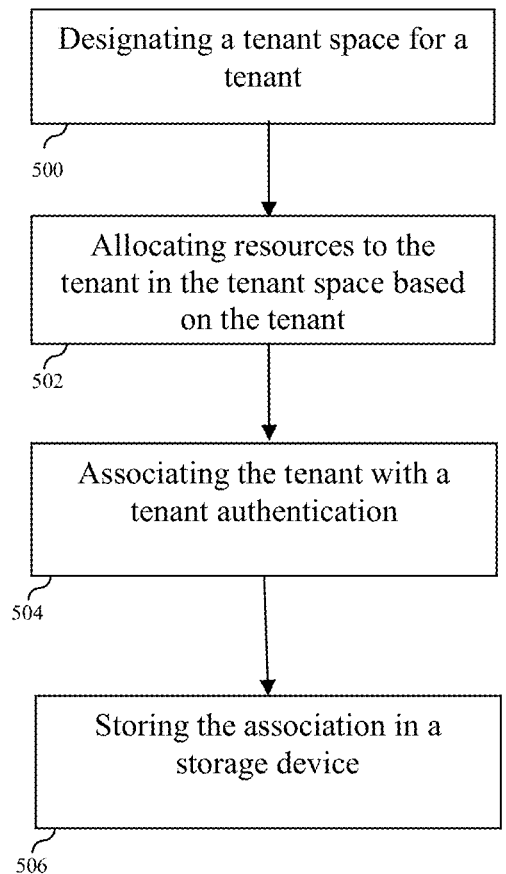
FIG. 5 is a flowchart of a method to manage a cloud computing environment in accordance with some embodiments.

FIG. 5 illustrates a method to manage a cloud computing environment with some embodiments. In step 500, a tenant space is designated for a tenant. In step 502, resources are allocated to the tenant in the tenant space based on the tenant. In step 504, the tenant is associated with an authentication. In step 506, the association is stored in a storage device. When the tenant is successfully authenticated (e.g. successful username/password login), the tenant is granted access to the resources allocated to the tenant in the tenant space. The tenant cannot see other resources, even the other resources reside in a space in the tenant space.

A cloud service provider may use physical mapping policies to provide different physical resources to different tenants or users. For example, Server 1 may be rated "standard performance," and may be assigned to spaces accessible by "basic membership" users. Similarly, Server 2 may be rated "high performance," and may be assigned to spaces accessible only by "premier membership" users.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for managing a cloud computing environment, the method comprising:
    designating a tenant space for a tenant, wherein the tenant space inherits at least a portion of a mapping policy from a parent space, and wherein the tenant space includes a first space, and wherein the at least a portion of a mapping policy takes precedence over the tenant space's mapping policy if there is a conflict;
    allocating resources to the tenant in the tenant space based on the tenant and based on the mapping policy, and wherein the allocated resources include resources in the parent space, and wherein allocating resources includes allocating a first portion of the first space's resources and allocating a second portion of the first space's resources to a second tenant, and wherein the tenant is unable to access the second portion of the first space's resources;
    associating the tenant with a tenant authentication; and
    storing the association in a storage device.

2. The method as recited in claim 1, further comprising allowing the tenant access to the allocated resources upon successful authentication of the tenant.

3. A system for managing a cloud computing environment, comprising a storage device and a processor configured to:
    designate a tenant space for a tenant, wherein the tenant space inherits at least a portion of a mapping policy from a parent space, and wherein the tenant space includes a first space, and wherein the at least a portion of a mapping policy takes precedence over the tenant space's mapping policy if there is a conflict;
    allocate resources to the tenant in the tenant space based on the tenant and based on the mapping policy, and wherein the allocated resources include resources in the parent space, and wherein allocate resources includes allocating a first portion of the first space's resources and allocate a second portion of the first space's resources to a second tenant, and wherein the tenant is unable to access the second portion of the first space's resources;
    associate the tenant with a tenant authentication; and
    store the association in the storage device.

4. A computer program product for managing a cloud computing environment, comprising a non-transitory computer readable medium having program instructions embodied therein for:
    designating a tenant space for a tenant, wherein the tenant space inherits at least a portion of a mapping policy from a parent space, and wherein the tenant space includes a first space, and wherein the at least a portion of a mapping policy takes precedence over the tenant space's mapping policy if there is a conflict;
    allocating resources to the tenant in the tenant space based on the tenant and based on the mapping policy, and wherein the allocated resources include resources in the parent space, and wherein allocating resources includes allocating a first portion of the first space's resources and allocating a second portion of the first space's resources to a second tenant, and wherein the tenant is unable to access the second portion of the first space's resources;
    associating the tenant with a tenant authentication; and
    storing the association in a storage device.

* * * * *